US006534178B2

(12) United States Patent
Zhou et al.

(10) Patent No.: US 6,534,178 B2
(45) Date of Patent: Mar. 18, 2003

(54) CARBOXYL-FUNCTIONAL POLYESTER EPOXY RESIN POWDER COATINGS BASED ON 1,3-PROPANEDIOL

(75) Inventors: Lichang Zhou, Cranbury, NJ (US); Shelby F. Thames, Hattiesburg, MI (US); Oliver Wendell Smith, Petal, MI (US); Wyndham Henry Boon, North Canton, OH (US); Thomas Clayton Forschner, Richmond, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/808,975

(22) Filed: Mar. 15, 2001

(65) Prior Publication Data

US 2001/0047062 A1 Nov. 29, 2001

Related U.S. Application Data

(60) Provisional application No. 60/192,111, filed on Mar. 24, 2000, and provisional application No. 60/160,339, filed on Oct. 19, 1999.

(51) Int. Cl.[7] .............................................. B32B 27/36

(52) U.S. Cl. ...................... 428/413; 525/438; 525/533; 525/934; 528/272

(58) Field of Search ............................... 525/438, 533, 525/934, 31; 428/413; 528/272

(56) References Cited

U.S. PATENT DOCUMENTS

| | | | | | |
|---|---|---|---|---|---|
| 3,502,609 | A | * | 3/1970 | Barie, Jr. et al. | 260/37 |
| 4,085,159 | A | | 4/1978 | Marsiat | 260/835 |
| 4,740,580 | A | | 4/1988 | Merck et al. | 528/272 |
| 5,739,204 | A | | 4/1998 | Piana | 524/539 |
| 5,763,104 | A | | 6/1998 | Stouffer et al. | 528/503 |
| 5,777,045 | A | * | 7/1998 | Carr | 525/438 |
| 5,880,223 | A | * | 3/1999 | Shah et al. | 525/438 |
| 5,994,462 | A | | 11/1999 | Srinivasan et al. | 525/65 |
| 6,015,864 | A | | 1/2000 | Koenraadt et al. | 525/385 |
| 6,025,035 | A | | 2/2000 | Seo et al. | 427/470 |

FOREIGN PATENT DOCUMENTS

| | | | |
|---|---|---|---|
| EP | 0008344 A2 | 7/1979 | C09D/3/66 |
| FR | 2289556 | 5/1976 | |

* cited by examiner

*Primary Examiner*—Robert Dawson
*Assistant Examiner*—Christopher M Keehan
(74) *Attorney, Agent, or Firm*—Donald F. Haas

(57) ABSTRACT

In accordance with the foregoing, the present invention comprises a polyester epoxy resin powder coating exhibiting improved impact resistance and flexibility, without the loss of other key properties and where the 1,3-PDO modified polyester has lower melt viscosity than polyesters made with 100% neopentyl glycol, which is formed by reacting:

a) A carboxyl functional polyester resin formed by reacting one or more aliphatic glycols and one or more polycarboxylic acids and/or anhydrides, wherein 5 to 90% (on a molar basis) of the aliphatic glycol is 1,3-propanediol, in the presence of an esterification catalyst and then endcapping the polyester with an endcapping agent to ensure that the polyester has carboxyl chain ends; and b) An epoxy resin crosslinking agent.

20 Claims, 2 Drawing Sheets

Tg (°C) ⟶
80
75
70
65
60
55
50
45
40
35
30
0 20 40 60 80 100 120
PDO CONTENT (%) ⟶

CPE 00
CPE 30
CPE 50
HEAT FLOW (W/g)
-0.15
-0.25
-0.35
-0.45
-0.55
0
40
80
120
160
200
240
TEMPERATURE (°C)

20 °C
60 °C
GLOSS
160
140
120
100
80
60
40
20
0
CPE 00
CPE 30
CPE 50
PIGMENT-CPE 00
PIGMENT-CPE 30
POWDER COATINGS

CARBOXYL-FUNCTIONAL POLYESTER EPOXY RESIN POWDER COATINGS BASED ON 1,3-PROPANEDIOL

CROSS REFERENCE

This application claims the benefit of U.S. Provisional Application No. 60/192,111 filed Mar. 24, 2000, and Provisional Application No. 60/160,339, filed Oct. 19, 1999, the entire disclosure of which is hereby incorporated by references.

FIELD OF INVENTION

This invention relates to an epoxy resin crosslinked polyester powder coating. More particularly, this invention relates to the modification of the polyester typically used in carboxyl functional polyester-epoxy coatings with 1,3-propanediol (1,3-PDO) for significantly improved flexibility and impact resistance, with other key properties unchanged over a broad range of 1,3-PDO concentrations. In addition, the 1,3-PDO modified polyester has lower melt viscosity than polyesters made with 100% neopentyl glycol.

BACKGROUND OF THE INVENTION

The development of powder coatings has become increasingly significant in recent years. Powder coatings release no harmful solvents during application, may be applied in a highly efficient manner with little waste, and, thus, are considered particularly environmentally friendly and economical. Usable powder coatings may be obtained using curable epoxy resin powder coatings. Many epoxy resin powder coatings currently commercially available contain solid polyester polyols which are cured with epoxy resins.

Polymers used in the manufacture of powder coatings are classified broadly as either thermosetting or thermoplastic. Thermosetting coatings, when compared to coatings derived from thermoplastic compositions, generally are tougher, more resistant to solvents and detergents, have better adhesion to metal substrates, and do not soften when exposed to elevated temperatures. However, the curing of thermosetting coatings has created problems in obtaining coatings which have, in addition to the above-stated desirable characteristics, good smoothness, and flexibility.

Thermoset powder coatings can be grouped into epoxy, epoxy-polyester, polyester-urethane, TGIC polyester, and acrylic. Epoxy-polyester coatings have better color retention and UV resistance than epoxy powder coatings. Such coatings are widely used in the household equipment such as refrigerators, freezers, washing machines, stoves, and other kitchen equipment, metal furniture, ceiling panels for the building industry, shower cabinets, automotive components, agricultural equipment, and machinery, engineering, and electrical parts.

Coatings derived from thermosetting coating compositions should possess good impact strength, hardness, flexibility, and resistance to solvents and chemicals. For example, good flexibility is essential for powder coating compositions used to coat sheet (coil) steel which is destined to be formed or shaped into articles used in the manufacture of various household appliances and automobiles where the sheet metal is flexed or bent at various angles.

Powder coating systems based on carboxyl polyesters such as neopentyl glycol based carboxyl polyesters and melamine-, benzoguanamine-, and urea-formaldehyde cross-linking agents have been used in the coatings industry. See, for example, those described in U.S. Pat. No. 5,739, 204, incorporated by reference herein in the entirety. EP 8344 discloses a similar system and mentions the use of 1,3-PDO.

Neopentyl glycol is often used in formulations for polyester powder coatings along with a mixture of terephthalic and isophthalic acids either by themselves or as mixtures and optionally branched with small amounts of trimethylol propane. Typically when the polyester used in this type of powder coating is modified for improved flexibility, impact, and toughness, then other properties of significance to the coating are compromised. Other potential modifiers include adipic acid, 1,4-butanediol, and 2-methyl-1,3-propanediol.

There does not appear to be any reference in the art which suggests the incorporation of 1,3-propanediol into a carboxyl functional polyester epoxy resin powder coating composition for increased impact resistance and flexibility without the loss of other critical properties and also where the 1,3-PDO modified polyester has lower melt viscosity than polyesters made with 100% neopentyl glycol.

SUMMARY OF THE INVENTION

In accordance with the foregoing, the present invention comprises a polyester epoxy resin powder coating exhibiting improved impact resistance and flexibility, without the loss of other key properties and where the 1,3-PDO modified polyester has lower melt viscosity than polyesters made with 100% neopentyl glycol, which is formed by reacting:

a) A carboxyl functional polyester resin formed by reacting one or more aliphatic glycols and one or more polycarboxylic acids and/or anhydrides, wherein 5 to 90% (on a molar basis) of the aliphatic glycol is 1,3-propanediol, in the presence of an esterification catalyst and then endcapping the polyester with an endcapping agent to ensure that the polyester has carboxyl chain ends; and b) An epoxy resin crosslinking agent.

It has now been demonstrated that by partially replacing the neopentyl glycol with 1,3-propanediol the formulation exhibits improved impact resistance and flexibility with other key properties essentially unchanged over a broad range of 1,3-propanediol concentrations and also that the 1,3-PDO modified polyester has a lower melt viscosity than polyesters made with 100% neopentyl glycol.

DETAILED DESCRIPTION OF THE INVENTION

Figure 1:
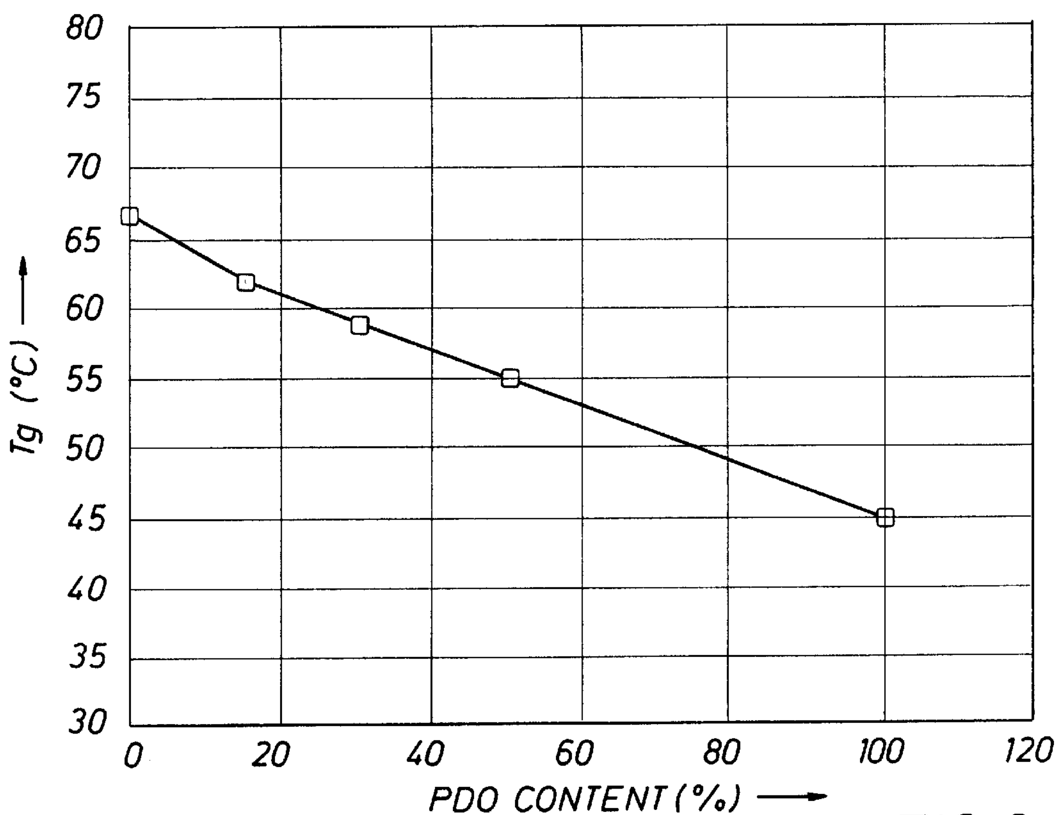
FIG. 1 is a graph showing the glass transition temperatures of the various formulations.

In the present invention it has been found that replacing the aliphatic glycol, which preferably is neopentyl glycol (NPG), with from 5 to 90%, preferably 10 to 50%, 1,3-propanediol (1,3-PDO) on a molar basis provides significant improvements in the impact resistance and flexibility of epoxy resin crosslinked polyester powder coatings, while other properties were about the same as noted in a control using 100% NPG; and also the 1,3-PDO modified polyester has a lower melt viscosity than polyesters made with 100% neopentyl glycol. Properties of carboxyl capped polyesters that were examined were carboxy equivalent, acid number, color before grinding, glass transition temperature ($T_g$), processability, storage stability, front/reverse impact, powder flow properties, powder reactivity, hardness, adhesion, MEK double rub, and chemical and stain resistance.

The preferred carboxyl capped polyesters are characterized by an acid number of 30 to 120 mg KOH/g, preferably 40 to 110 mg KOH/g, and a $T_g$ of greater than 40° C. The acid number=56,100/equivalent weight (56,100 is the weight in mg per mole KOH). Low equivalent or high acid number results in high crosslinking density and brittleness, while high equivalent or low acid number results in low crosslinking density, and thus poor performance such as low methylethylketone and solvent resistance, etc. The $T_g$ range is generally a requirement for good storage stability.

The starting materials for the polyester of the present invention are aliphatic diols including 1,3-PDO, aromatic polycarboxylic acids or anhydrides, an esterification catalyst, and optionally a branching agent. The starting materials for the cured coatings of this invention are the 1,3-PDO containing polyester, one or more epoxy resins, a crosslinking catalyst and optionally conditioning agents, auxiliary agents, and additives.

Suitable aliphatic diols have a number average molecular weight of 62 to 500 and may optionally contain ether groups, ester groups, and/or carbonate groups. Suitable aliphatic diols include, but are not limited to, ethylene glycol, 1,2-propanediol, 2-methyl-1,3-propanediol, 1,3- and 1,4-butanediol, 1,6-hexanediol, diethylene glycol, dipropylene glycol, neopentyl glycol and mixtures of these diols. Other suitable diols include triethylene glycol, tetraethylene glycol, tripropylene glycol, tetrapropylene glycol, polycarbonate diols having hydroxyl numbers of about 56 to 168, dimeric fatty alcohols and mixtures of these diols. The reactive hydroxyl component (carboxyl, amide) can be simple monomeric units or oligmeric units or low molecular weight polymeric units. The preferred diols are aliphatic glycols such as 1,3-butylene glycol or 1,4-butylene glycol; ethylene glycol and propylene glycols; and neopentyl glycol. Neopentyl glycol was most preferred and used in the examples herein. Also useful is a minor amount of a trihydric or higher alcohol as will be discussed below.

Suitable acids include saturated, unsaturated, aliphatic, or aromatic polycarboxylic acids and/or anhydrides such as phthalic, isophthalic, terephthalic, sebacic, maleic, fumaric, succinic, adipic, azelaic, malonic, dodecanedioic, trimellitic, pyromellitic, and similar polycarboxylic acids. The polycarboxylic acids and/or anhydrides preferred in the present invention are isophthalic, terephthalic, and trimellitic used individually or mixed. It is preferable to use the acid form in this reaction step. Most preferred is a mixture of terephthalic acid to isophthalic acid in a molar ratio of 90/10 to 50/50.

A branching agent is also useful, such as, for example, a small amount of a triol or higher alcohol. Suitable branching agents include, but are not limited to trimethylolethane, trimethylolpropane, or pentaerythritol. The preferred was trimethylolpropane.

The carboxyl functional polyesters of the invention may be synthesized by a two stage process. This is an esterification reaction. In the first stage, dibasic acid such as terephthalic acid (TPA), isophthalic acid (IPA), polyols such as NPG and PDO diols, and optional branching agents like trimethylolpropane are reacted at a temperature in the range of 150 to 250° C., preferably 170 to 230° C., to form a hydroxyl-terminated prepolymer.

In the second stage, the hydroxyl groups are endcapped with carboxylic acids or their anhydrides to form an acid polyester. The amount of endcapping agent used is determined by the hydroxyl number of the polyester. From 80 to 100% of the stoichiometric amount required to cap all of the chain ends of the polyester is generally added. The endcapping agents which can be utilized are generally acids or anhydrides containing a plurality of carboxylic acid groups, that is two or more carboxylic groups per molecule. Suitable acids include saturated, unsaturated, aliphatic, or aromatic dicarboxylic acids such as phthalic, isophthalic, terephthalic, sebacic, etc., including those mentioned above. Terephthalic acid is preferred with isophthalic acid being highly preferred. Anhydrides of these acids, if there are any, can also be used as endcapping agents and are preferred, including the anhydrides of the acids described above, and especially including phthalic anhydride, trimellitic anhydride, succinic anhydride, etc., wherein trimellitic anhydride is preferred. The endcapping agent is added to the prepolymer and the esterification is continued until a desired acid number is obtained. The total reaction time is approximately 10 to 15 hours.

A conventional catalyst for promotion of an esterification reaction, such as dibutyltin oxide, can be used in catalytic amounts of 0.01 to 1 wt %. The catalyst can be added in either Stage 1 or Stage 2. Catalysts which can be for the esterification include tin, atimony, titanium, and zirconium compounds, including titanium alkoxides and derivatives thereof, such as tetra(2-ethylhexyl)titanate, tetrastearyl titanate, diisopropoxy-bis(acetylacetonato) titanium, di-n-butoxy-bis(triethanolaminoato)titanium, tributyl monoacetyltitanate triisopropyl monoacetyltitanate and tetrabenzoic acid titanate; titanium complex salts such as alkali titanium oxalates and malonates, potassium hexafluorotitanate and titanium complexes with hydroxycarboxylic acids such as tataric acid, citric acid or lactic acid, catalysts such as titanium dioxide/silicon dioxide coprecipitate and hydrated alkaline-containing titanium dioxide; and the corresponding zirconium compounds.

Xylene/water can be added before the reaction starts to facilitate the removal of water formed during the reaction. In the examples, 1,3-propanediol was substituted for neopentyl glycol in molar increments of 0, 15, 30, 50, and 100%.

There are alternative ways of carrying out the reaction, as will be apparent to those skilled in the art. A commercial scale reaction would probably rarely use xylene/water and could start with an ester, such as dimethylterephthalate (DMT) or dimethylisophthalate (DMI). It is also possible to use acid chlorides.

Powder coatings may be prepared from the 1,3-propanediol derived polyesters formulated with an epoxy resin crosslinking agent, a flow control agent, and a crosslinking catalyst. Conventional pigmenting materials (pigments or dye), such as titanium dioxide, may also be included in the formulation to impart a desirable color to the coated substrate.

Epoxy resins suitable for the invention composition are generally any epoxy resins which are solid at room temperature. The epoxy resin preferably has an average weight per epoxide (WPE) within the range of 400 to 1400 and a number average molecular weight within the range of 800 to 5000. More preferably, the epoxy resin has a WFE of 500 to 1000 and a number average molecular weight of 1000 to 2000. Higher WPE's and molecular weights may be used, provided that the resin is blended at the processing temperature and processable in a high shear mixer or a melt blender.

Generally the epoxy resin will have a 1,2-epoxy equivalency greater than one and preferably about two or more. The epoxy resin may be saturated or unsaturated, aliphatic, cycloaliphatic, aromatic or heterocyclic. Examples of epoxy resins suitable for use in the invention include polyglycidyl ethers of polyhydric compounds, brominated epoxies, epoxy novolacs or similar polyhydroxyphenol resins, polyglycidyl ethers of glycols or polyglycols, and polyglycidyl esters of polycarboxylic acids. Preferably the epoxy resin is a polyglycidyl ether of a polyhydric phenol. Polyglycidyl ethers of polyhydric phenols can be produced, for example, by reacting an epihalohydrin with a polyhydric phenol in the presence of an alkali. Examples of suitable polyhydric phenols include: 2,2-bis(4-hydroxyphenyl) propane (bisphenol-A; 2,2-bis(4-hydroxy-tert-butylphenyl) propane; 1,1-bis(4-hydroxyphenyl) ethane; 1,1-bis(4-hydroxyphenyl) isobutane; 2,2-bis(4-hydroxytertiarybutylphenyl) propane; bis(2-hydroxynapthyl) methane; 1,5-dihydroxynaphthalene; 1,1-bis(4-hydroxy-3-alkylphenyl) ethane and the like. The preferred polyhydric phenol is bisphenol-A. Commercial examples of suitable epoxy resins include advanced EPON® Resin 828, a product of Shell Chemical Company which is a diglycidyl ether of 2,2-bis(4-hydroxyphenyl)propane having an average molecular weight of 380 and a weight per epoxy in the range of 180 to 195. The preferred crosslinking agents are EPON® Resins 1001F, 1002F, and 2002, which are advanced EPON® 828 resins reacted with bisphenol-A which have a weight per epoxy of 450 to 900.

A flow control or leveling agent is desirably incorporated into the coating formulation to aid in leveling the applied and thermoset coatings. Such flow control agents typically comprise acrylic polymers and are available from several suppliers, i.e., MODAFLOW from Monsanto Company, BYK 360P from BYK Mallinkrodt and ACRONAL from BASF. A suitable concentration range for incorporation of the flow control agent into the coating is 0.25 to 2.0% based on the weight of the resin solids, and preferably in the range of 0.60 to 1.5%.

The powder coatings can be cured or crosslinked without the use of a catalyst. However, it has found it to be a practical necessity to include a catalyst to promote the crosslinking reaction of the epoxy resin with the polyesters. The uncatalyzed rate of reaction has been found to be too slow to suit the baking schedules established in the industry. Suitable catalysts include amine containing compounds, such as amides, imides, imidazoles, quaternary ammonium salts, phosphonium salts, metal salts of acidic and fatty acids, tin and zinc compounds, and the like. Specific samples of these catalysts are tetrabutylammonium and choline chloride. These catalysts may be used either alone or in combination. Further, as the kind and amount of the catalyst to be used are variable depending on the kind and amount of the resin and the curing conditions, careful selection is necessary to meet the required performance. A suitable concentration range for incorporation of the catalyst into the coating is about 0.01 to 1% based on the weight of the resin solids, and preferably in the range of 0.05 to 0.5%.

EXAMPLES

Synthesis of Carboxyl Functional Polyesters

A two-stage process was used for the synthesis of carboxyl functional polyesters. In stage 1, terephthalic acid (TPA), isophthalic acid (IPA), NPG and PDO were reacted at 170 to 230° C. in a 1 liter round bottom flask under nitrogen to form a prepolymer. In stage 2, trimellitic anhydride (TMA) was added and the esterification was continued to an acid value of 100 to 110. The total reaction time was approximately 10 to 15 hours. Dibutyltin oxide (0.4%) as used as a catalyst and xylene/water were added to facilitate the removal of water formed during the reaction. Polyester compositions with molar substitutions of PDO for NPG from 0 to 100% are listed in Table 1.

TABLE 1

Mole Composition of the Carboxyl Functional Polyester Resins

| Set | CPE00 | CPE15 | CPE30 | CPE50 | CPE100 |
|---|---|---|---|---|---|
| NPG/PDO (mole) | 100/0 | 85/15 | 70/30 | 50/50 | 0/100 |
| Terephthalic Acid (TPA) | 1.376 | 1.397 | 1.426 | 1.461 | 1.556 |
| Isophthalic Acid (ITA) | 0.344 | 0.349 | 0.357 | 0.365 | 0.349 |
| Neopentyl Glycol (NPG) | 1.894 | 1.670 | 1.369 | 1.000 | 0.000 |
| 1,3-Propanediol (PDO) | 0.000 | 0.251 | 0.587 | 1.000 | 2.116 |
| Trimellitic Anhydride (TMA) | 0.349 | 0.348 | 0.346 | 0.346 | 0.343 |

Preparation of Powder Coatings

Polyester/epoxy hybrid powder coatings were prepared from the PDO derived polyesters formulated with epoxy resin via equal equivalents of carboxyl/epoxy groups. EPON® 1001F Resin from Shell Chemical Company, having an equivalent weight of 525–550, was used as a crosslinking agent for the polyesters. EPON® 1001F Resin has very low equivalent weight among the commercial available epoxy resins. 0.2% Choline chloride, Actiron CC-6 from Synthron, Inc., was used as a catalyst. A flow control agent (Modaflow Powder III, Monsanto) and a degassing agent, benzoin (Uraflow-B, GCA Chemical Corporation) were also incorporated into the coatings. Pigmented powder coatings were prepared by using R-960 $TiO_2$ (DuPont) at a pigment/binder ratio of 0.7/1 by weight. The final powder coating compositions are listed in Table 2.

All the ingredients were initially premixed in a high speed mixer for 2 minutes to assure homogeneous mixing and the solids were then fragmented into small particles. The resulting intimate mixture was then continuously processed through a twin screw extruder to produce a uniform viscous melt. The extrusion temperature was maintained at 75° C. in zone 1 and 80° C. in zone 2 at 50 rpm. The molten extrudates were passed through a pair of water cooled squeeze rolls to yield a friable product. The products were then pulverized using a hammer mill with liquid nitrogen fed slowly into the grinding chamber.

The final powders were electrostatic-spray applied to grounded cold-rolled steel panels (Q Panel QD-36 and S-36) and the coating properties were evaluated after curing at 190° C. for 15 minutes. The curing was carried out by placing panels in a hot air oven.

TABLE 2

Powder Coatings formulations

| Set | CPE00 | CPE30 | CPE50 | P-CPE00 | P-CPE30 |
|---|---|---|---|---|---|
| CPE00 | 48.65 | — | — | 28.55 | — |
| CPE30 | — | 49.38 | — | — | 28.98 |
| CPE50 | — | — | 49.38 | — | — |
| EPON ® 1001F Resin | 49.48 | 48.75 | 48.75 | 29.04 | 28.61 |
| DuPont R-960 $TiO_2$ | — | — | — | 40.31 | 40.31 |
| Choline Chloride | 0.20 | 0.20 | 0.20 | 0.20 | 0.20 |

TABLE 2-continued

| | Powder Coatings formulations | | | | |
|---|---|---|---|---|---|
| Set | CPE00 | CPE30 | CPE50 | P-CPE00 | P-CPE30 |
| Modaflow Powder III | 1.18 | 1.18 | 1.18 | 1.15 | 1.15 |
| Benzoin | 0.49 | 0.49 | 0.49 | 0.75 | 0.75 |
| Total | 100 | 100 | 100 | 100 | 100 |

Characteristics of Polyester Resins

The carboxyl functional polyester resins derived from PDO afforded properties similar to those based on NPG (Table 3). The glass transition temperatures ($T_g$) of the polyesters decreased with increasing PDO contents (FIG. 1). For example, the $T_g$ values ranged from 67° C. for the NPG polyester to 55° C. for the 50% PDO polyester. Glass transition temperatures for the carboxyl functional polyesters were 6 to 8 degrees higher than the corresponding hydroxyl functional polyesters. This characteristic of the carboxyl polyesters is expected to improve the storage stability of the corresponding powder coatings. $T_g$s for the polyesters were reported for the second heating cycle via Differential Scanning Calorimetry (DSC) at a scanning rate of 10° C./minute. The second heating cycle involved heating the samples to a melt and then cooling the resin prior to measuring the $T_g$.

Figure 2:
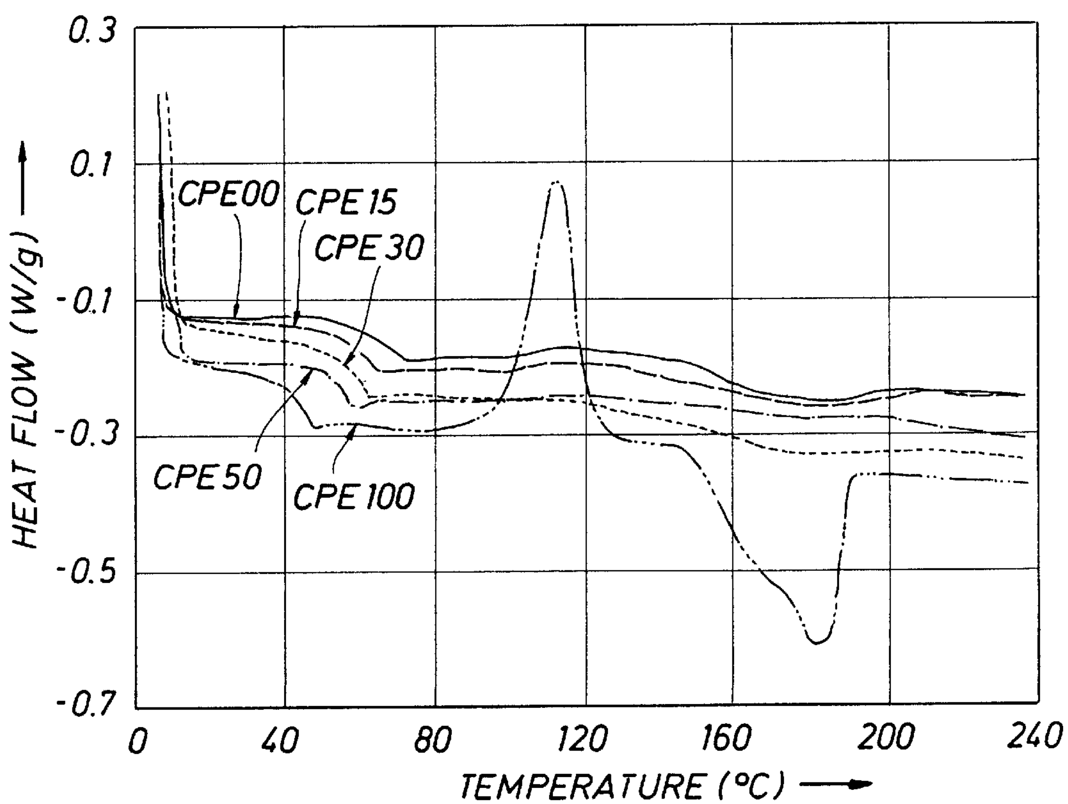
FIG. 2 is a graph showing the Differential Scanning Calorimetry (DSC) curves of carboxyl polyester resins.

No crystallization or melting peaks were noted on the DSC curves of polyesters derived from NPG or the NPG/PDO mixtures, indicating amorphous polyester (FIG. 2). However, the polyester from pure PDO was a semi-crystalline polymer with crystallization and melting temperatures of about 112 and 180° C., respectively. Therefore, partially replacing NPG with PDO up to 50 molar percent provided amorphous polyesters suitable for coating applications. It should be noted that the carboxyl polyesters were similar to the hydroxyl polyesters with respect to amorphous characteristics.

TABLE 3

| | Carboxyl Functional Polyesters Properties | | | | |
|---|---|---|---|---|---|
| Set | CPE00 | CPE15 | CPE30 | CPE50 | CPE100 |
| NPG/PDO (mole) | 100/0 | 85/15 | 70/30 | 50/50 | 0/100 |
| Carboxyl Equivalent | 529 | 534 | 545 | 545 | 530 |
| Acid Number | 106 | 105 | 103 | 103 | 105 |
| Mn | 2464 | 2579 | 2580 | 2238 | — |
| Polydispersity | 1.68 | 1.85 | 1.88 | 1.85 | — |
| Color Before Grinding | Slight yellow | Slight yellow | Slight yellow | Slight yellow | Slight yellow |

Processability

After premixing, the intimate powder mixture was continuously processed through a twin screw extruder to produce a uniform viscous melt. The extrusion temperature was maintained at 75° C. in zone 1 and 80° C. in zone 2 at 50 rpm. All the powder mixtures from NPG and PDO polyesters were easily processed through the extruder (Table 4).

TABLE 4

| | Processability of Polyester Powder Coatings | | | | |
|---|---|---|---|---|---|
| Set | C00 | C30 | C50 | P00 | P30 |
| Torque | 73% | 66% | 60% | 79% | 74% |
| Temperature, zone 1 (°C.) | 75 | 75 | 75 | 75 | 75 |
| Temperature, zone 2 (°C.) | 80 | 80 | 80 | 80 | 80 |
| Processability | Good | Good | Good | Good | Good |

Storage Stability

The glass transition temperature of polyester resins for powder coatings should be high enough to achieve good storage stability. Commercially available polyesters for polyester/epoxy hybrid powder coatings typically have $T_g$ values around 50 to 60° C. As expected, the powder coatings formulated with up to 50 percent PDO derived carboxyl polyesters had very good storage stability, since they had $T_g$ values over 55° C.

Storage stability tests were performed by placing powders in a capped jar at 40° C. for 10 days. The powders were subsequently examined each day for 10 days for free-flowing properties or lumps not easily broken. All samples had free-flowing properties after 10 days.

Inclined Plate Flow

The inclined plate flow was measured according to the PCI standard method. It is a useful indicator of the degree of flow occurring during the curing of powder coated parts. The inclined plate flow is related to the zero shear melt viscosity of the base resin and is influenced by the reactivity of crosslinking agent with the polyester resins. It was very clear that the plate flow increased with increasing PDO concentrations in the PDO/NPG mixtures at both 175° C. and 190° C. (Table 5). For instance, the inclined plate flow was 50, 68, and 79 mm for pure NPG, 30 percent, and 50 percent PDO levels, respectively. Therefore, incorporation of PDO improved the flow properties of the powder coatings. The powders also had higher plate flows at 175° C. than at 190° C., because of higher reaction rates at higher temperatures.

Gel Time Reactivity

Gel time reactivity is the time required for a powder to advance to a gelled state through a liquid phase at a defined temperature. The test was performed via rubbing the powder coating with the tip of a wooden applicator stick over a hot plate until a solid gel was produced. Gel times for polyester powder coatings were determined at 180° C. according to the PCI standard method. As seen in Table 5, all the coatings provided similar gel times, which is in accord with DSC studies.

TABLE 5

| | Inclined Plate Flow Test Results | | | | |
|---|---|---|---|---|---|
| Set | C00 | C30 | C50 | P00 | P30 |
| PDO % | 0 | 30 | 50 | 0 | 30 |
| Flow at 175° C. (mm) | 64 | 85 | 104 | 22 | 23 |
| Flow at 190° C. (mm) | 50 | 68 | 79 | 13 | 15 |
| Gel time at 180° C. (seconds) | 280 | 270 | 290 | 340 | 320 |

Reactivity of Powders

Figure 3:
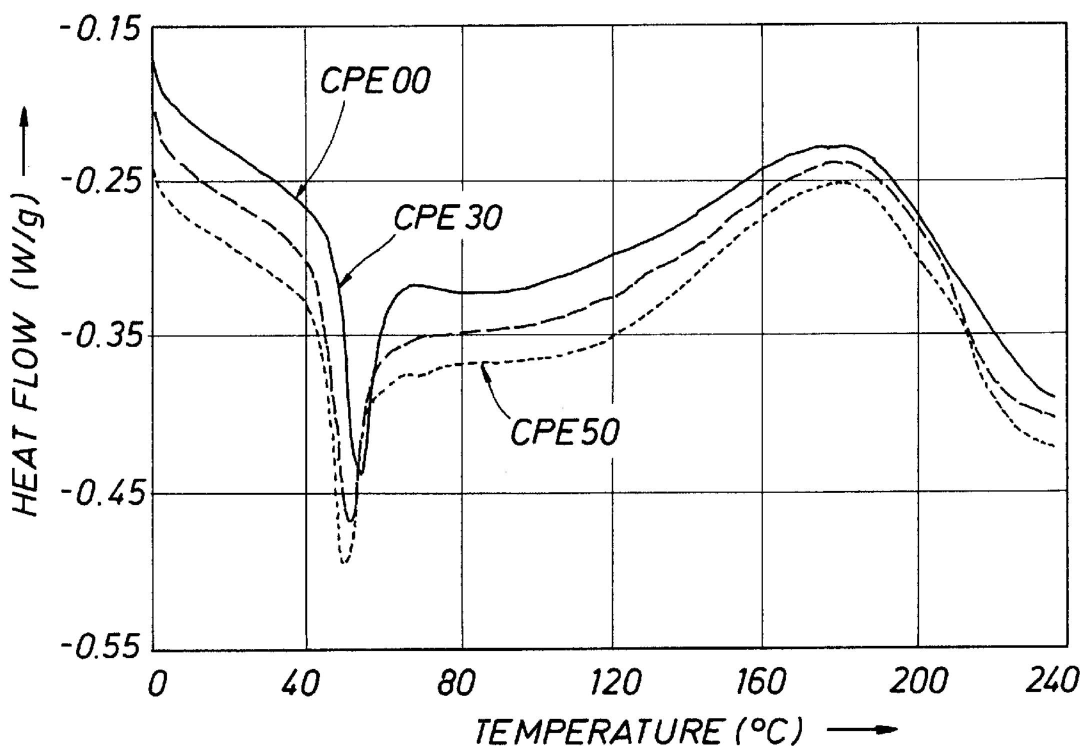
FIG. 3 is a graph showing the Differential Scanning Calorimetry (DSC) curves of polyester/epoxy hybrid powder coatings.

The reactivity of the carboxyl functional polyester polymers with epoxy resin crosslinking agents was studied via Differential Scanning Calorimetry (DSC) at a scanning rate of 10° C./minute. The DSC curves shown in FIG. 3, and the testing results shown in Table 6 indicate the onset of cure—exothermal peak and enthalpy are very close the powder coatings. Thus, polyesters based on NPG and PDO/NPG mixtures have similar reactivity with the crosslinking agent.

TABLE 6

DSC Results of the Reactivity of Powders

| Set | C00 | C30 | C50 |
|---|---|---|---|
| PDO % | 0 | 30 | 50 |
| Onset Temperature (° C.) | 110 | 108 | 111 |
| Peak (° C.) | 178 | 180 | 180 |
| Enthalpy (J/g) | 61.61 | 60.36 | 62.34 |

Impact resistance

The front and reverse impact resistance of the powder coatings were determined according to the ASTM D2794 standard method. The results in Table 7 indicated that PDO significantly improved the flexibility of both polyester/epoxy hybrid clear and pigmented powder coatings. For instance, the impact resistance increased from 50/30 in-lbs (front/reverse) for the coatings based on pure NPG polyester to 100/70 in-lbs for 30% PDO and to 160/160 in-lbs for 50% PDO derived polyesters at a film thickness around 2.5 mils. Moreover, the impact resistance was strongly dependent on the film thickness with thicker films having less flexibility.

TABLE 7

Front/Reverse Impact Resistance of Polyester/Epoxy Hybrid Powder Coatings

| Film Thickness (mil) | C00 (in. lb.) | C30 (in. lb.) | C50 (in. lb.) | P00 (in. lb.) | P30 (in. lb.) |
|---|---|---|---|---|---|
| 1.1–1.2 | — | — | — | 50/12 | 80/30 |
| 1.5–1.6 | 110/90 | 150/130 | 160/160 | — | — |
| 1.7–1.8 | — | — | — | 28/6 | 50/14 |
| 2.4–2.5 | 50/30 | 100/70 | 160/160 | — | — |

Figure 4:
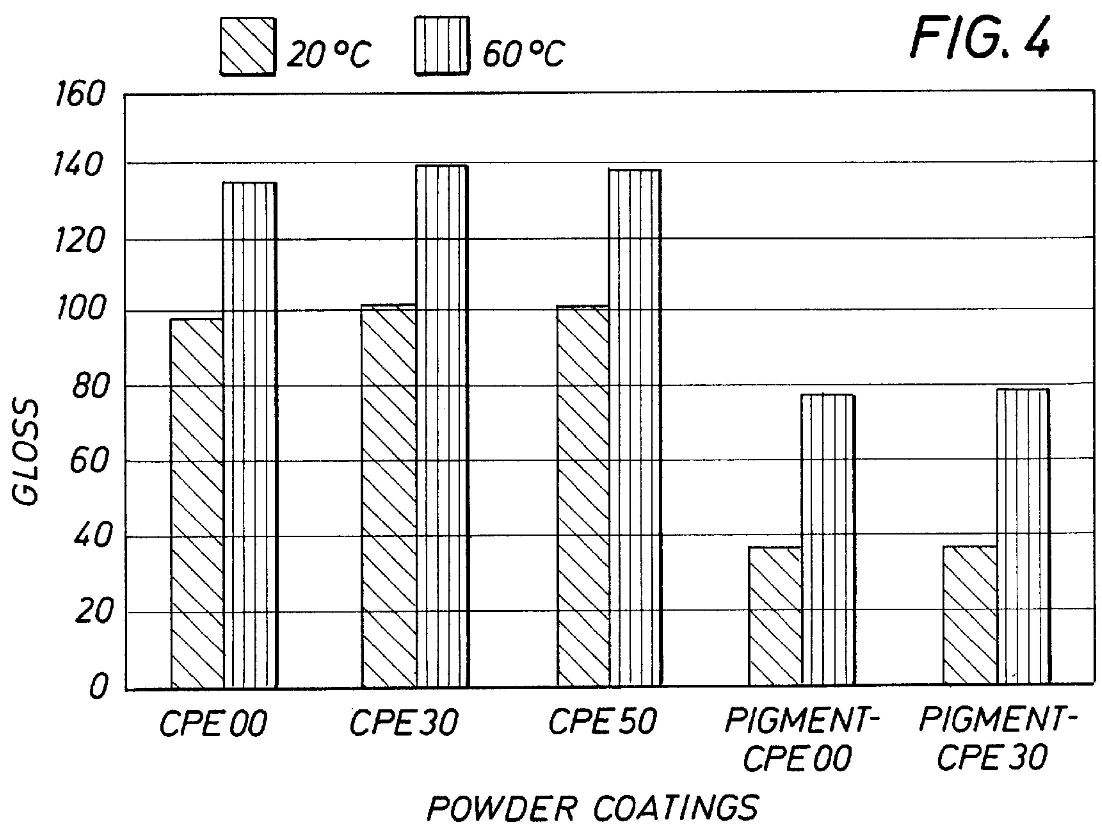
FIG. 4 is a graph showing the gloss of clear and pigmented polyester/epoxy powder coatings.

Gloss 20 and 60 degrees gloss of the polyester/epoxy clear and pigmented powder coatings is presented in FIG. 4. Incorporation of PDO gave slightly better gloss than pure NPG for clear coatings. Pigmented coatings containing polyesters with 30% PDO and 100% NPG had similar gloss values.

Hardness, Adhesion, and MEK Double-Rub Resistance

All coatings evaluated had excellent adhesion to cold rolled steel substrates (Table 8). They passed the crosshatch tape adhesion test in accord with ASTM D-3359-92 with a value of 5B, i.e., without failure. Replacing NPG with PDO had little affect on the final pencil hardness. In the case of MEK double rub resistance, 50% PDO gave slightly lower values than the 30% PDO and pure NPG. Therefore, coatings based on PDO/NPG mixture combined good film hardness, impact flexibility with high gloss, and excellent adhesion.

TABLE 8

Hardness, Adhesion and MEK Double-Rub Resistance Properties

| Properties | C00 | C30 | C50 | P00 | P30 |
|---|---|---|---|---|---|
| Film Thickness (mil) | 1.5 | 1.5 | 1.6 | 1.5 | 1.4 |
| Pencil Hardness | HB | HB | HB | 2H | 2H |
| Adhesion | 5B | 5B | 5B | 5B | 5B |
| MEK Double-Rubs | 50 | 50 | 46 | 75 | 75 |

Chemical and Stain Resistance

Coatings exposed to 10% HCl, 10% NaOH, gasoline, and mustard for 24 hours had excellent acid and caustic resistance compared to the control. Gasoline has a very slight affect after a 24-hour exposure. All the coatings exhibited very good stain resistance to mustard. It is apparent that the stain resistance is not only connected to the chemical resistance but also to the hardness of the coatings. Soft resins tend to stain more than the hard resins. PDO derived coatings had little effect on the pencil hardness and the chemical resistance, hence no effect on the stain resistance was observed (Table 9). The data is presented in the form of ratings with 10 representing no effect and 1 indicating the most severe deterioration.

TABLE 9

Chemical and Stain Resistance of Powder Coatings

| | C00 | C30 | C50 | P00 | P30 |
|---|---|---|---|---|---|
| 10% HCl | 10 | 10 | 10 | 10 | 10 |
| 10% NaOH | 10 | 10 | 10 | 10 | 10 |
| Mustard | 10 | 10 | 10 | 10 | 10 |
| Gasoline | 9 | 9 | 9 | 9 | 9 |

Flexibility-Conical Mandrel Bend and T-Bend Test

Conical mandrel bend tests were performed via bending the coating panels on a conical mandrel tester (Gardner Laboratory, Inc., ⅛" diameter) over a period of 3 seconds. The testing results are listed in Table 10. All clear coating panels passed the test, i.e., no cracking. However, the pigmented coating formulated with pure NPG polyester showed about 6 mm cracking upon mandrel bending, while coating incorporation of 30 percent PDO derived polyester passed the test.

Flexibility measured via the T-bend test revealed that incorporation of 30 percent PDO provided a 1T coating whereas pure NPG resulted in a 3T value. Coating containing 50 percent PDO provided very good flexibility with OT values. In the case of the pigmented coatings, pure NPG resulted in a 5T value compared to a 3T when 30 percent PDO was incorporated. Therefore, these results provide further data on the contribution of PDO to improved flexibility of the powder coatings.

TABLE 10

Conical Mandrel Bend and T-Bend Test Results

| | C00 | C30 | C50 | P00 | P30 |
|---|---|---|---|---|---|
| PDO % | 0 | 30 | 50 | 0 | 50 |
| Film Thickness (mil) | 1.5 | 1.5 | 1.6 | 1.5 | 1.6 |
| 1/8" Conical Mandrel Bending | Pass | Pass | Pass | Cracking at 6 mm | Pass |
| T-Bend | 3T | 1T | 0T | 5T | 3T |

We claim:

1. A polyester powder coating composition having an acid number of 30 to 120 mg KOH/g formed by reacting:

a) A polyester resin formed by reacting one or more aliphatic glycols and one or more polycarboxylic acids and/or anhydrides, wherein the aliphatic glycol is comprised of 5 to 90% 1,3-propanediol on a molar basis, in the presence of an esterification catalyst and then endcapping the polyester with an agent to ensure that the polyester has carboxyl chain ends; and b) An epoxy resin crosslinking agent.

2. The powder coating composition of claim 1 wherein the 1,3-propanediol comprises from 10 to 50% of the aliphatic glycols.

3. The powder coating composition of claim 1 wherein the aliphatic glycol has a number average molecular weight of 62 to 500.

4. The powder coating composition of claim 1 wherein the aliphatic glycol is selected from the group consisting of 1,3-butylene glycol, 1,4-butylene glycol, ethylene glycol, diethylene glycol, 1,2-propanediol, 1,6-hexanediol, triethylene glycol, tetraethylene glycol, tripropylene glycol, tetrapropylene glycol, dipropylene glycol, 2-methyl-1,3-propanediol, polycarbonate diols having hydroxyl numbers of 56 to 168, dimeric fatty alcohols, and neopentyl glycol.

5. The powder coating composition of claim 4 wherein the aliphatic glycol is neopentyl glycol.

6. The powder coating composition of claim 1 further comprising minor amounts of branching agents selected from the group consisting of trimethylol propane, trimethylol ethane, and pentaerythritol.

7. The powder coating composition of claim 1 wherein the polycarboxylic acids and/or anhydrides are selected from the group consisting of saturated, unsaturated, aliphatic, and aromatic polycarboxylic acids and/or anhydrides.

8. The powder coating composition of claim 7 containing a polycarboxylic acid and/or anhydride which is selected from the group consisting of phthalic, isophthalic, terephthalic, sebacic, maleic, fumaric, succinic, adipic, azelaic, malonic, dodecanedioc, trimellitic, pyromellitic, or mixtures thereof.

9. The powder coating composition of claim 8 containing a polycarboxylic acid and/or anhydride which is selected from the group consisting of isophthalic, terephthalic, and trimellitic, or mixtures thereof.

10. The powder coating composition of claim 9 wherein terephthalic acid and isophthalic acid are used in a molar ratio of terephthalic to isophthalic acid of 90/10 to 50/50.

11. The powder coating composition of claim 1 wherein the amount of endcapping agent added is from 80 to 100% of the stoichiometric amount required to cap all of the chain ends of the polyester.

12. The powder coating composition of claim 11 wherein the endcapping agent is selected from the group consisting of carboxylic acids and anhydrides which contain two or more carboxylic acid groups per molecules.

13. The powder coating composition of claim 12 wherein the endcapping agent is a carboxylic acid or anhydride selected from the group consisting of phthalic, isophthalic, terephthalic, sebacic, maleic, fumaric, succinic, adipic, azelaic, malonic, dodecanedioc, trimellitic, pyromellitic, or mixtures thereof.

14. The powder coating composition of claim 1 wherein the epoxy resin has an average weight per epoxy of 400 to 1400 and a number average molecular weight of 800 to 5000.

15. The powder coating composition of claim 14 wherein the epoxy resin is a diglycidyl ether of 2,2-bis(4-hydroxy phenyl) propane which has been reacted with bisphenol-A and has a weight per epoxy of 450 to 900.

16. The powder coating composition of claim 1 wherein a crosslinking catalyst is used to facilitate the reaction of a) and b).

17. The powder coating composition of claim 16 wherein the crosslinking catalyst is choline chloride.

18. A polyester powder coating composition having an acid number of 30 to 120 mg KOH/g formed by reacting:

a) A polyester resin formed by reacting a mixture of neopentyl glycol and 1,3-propanediol, wherein the 1,3-propanediol comprises from 5 to 90% of the mixture on a molar basis, with a mixture of terephthalic acid and isophthalic acid, wherein the ratio of terephthalic acid to isophthalic acid is in the range of 90/10 to 50/50, in the presence of dibutyl tin oxide, and adding trimellitic anhydride to endcap the polyester; and b) An epoxy resin crosslinking agent which is a diglycidyl ether of 2,2-bis(4-hydroxy phenyl) propane which as been reacted with bisphenol-A and has a weight per epoxy of 450 to 900.

19. The powder coating composition of claim 18 wherein the 1,3-propanediol comprises from 10 to 50% of the mixture of neopentyl glycol and 1,3-propanediol.

20. A product comprising a substrate coated with the powder coating of claim 1.

* * * * *